April 14, 1970 H. V. NEYROUD 3,506,318

PHONOGRAPH RECORD SELECTOR

Filed April 4, 1968 3 Sheets-Sheet 1

Inventor
Henri V. Neyroud
by
Edwin E. Greigg

April 14, 1970 H. V. NEYROUD 3,506,318

PHONOGRAPH RECORD SELECTOR

Filed April 4, 1968 3 Sheets-Sheet 2

United States Patent Office 3,506,318
Patented Apr. 14, 1970

3,506,318

PHONOGRAPH RECORD SELECTOR

Henri Vincent Neyroud, 55 Avenue de la Court de France, Juvisy-sur-Orge 91, Essonne, France Filed Apr. 4, 1968, Ser. No. 718,868
Claims priority, application France, May 9, 1968, 101,502
Int. Cl. A47f *1/12;* A47b *81/06*
U.S. Cl. 312—15 10 Claims

ABSTRACT OF THE DISCLOSURE

A phonograph record selector device in which a plurality of records are stored in a juxtaposed aligned vertical position, the selector comprises a plurality of arms arranged in an aligned horizontal series and spaced so that a record can be placed between each adjacent arm; each arm has at both ends arcuate cradle elements to support said record by engaging circumferential portions thereof; the forward portion of each arm is linked to a manually operable key which when depressed causes the selected arm to be displaced upwardly parallel to itself and thus bring the selected disc out of alignment of the other stored records, and a plurality of means to ensure a precise guidance of each arm during its displacement.

FIELD AND SUMMARY OF THE INVENTION

The invention relates to a phonograph record selector to present for easy removal a selected one of a plurality of records stored therein in a horizontally juxtaposed, aligned, vertical position. The selection is performed by depressing a key on a keyboard associated with the mechanism.

The object of the invention is to provide an improved record selector in which each record is guided in a very accurate manner and the risks of jamming, due to accidental lateral displacement of a record or the moving parts of the mechanism, is eliminated.

Briefly stated, the novel record selector comprises a plurality of horizontally juxtaposed spaced arms between which a record may be placed and which are provided at least at one end with an element which is arcuate and extends across the space between two adjacent arms to serve as a cradle for the record by engaging a portion of its periphery. At the front end each arm is linked to a manually depressible key which when operated causes the arm to be displaced upwardly parallel to itself carrying with it the selected record which thus is presented and ready for removal by hand. At both the rear end and the front end of each arm there are provided a plurality of means to maintain a sufficient distance between the arms to prevent jamming of the records and to ensure that each arm is guided in an accurate manner during its displacement.

The invention will be better understood from the ensuing detailed specification of an exemplary embodiment taken in conjunction with the drawings.

DESCRIPTION OF THE PREFERRED EMBODIMENT

Figures 1, 2:
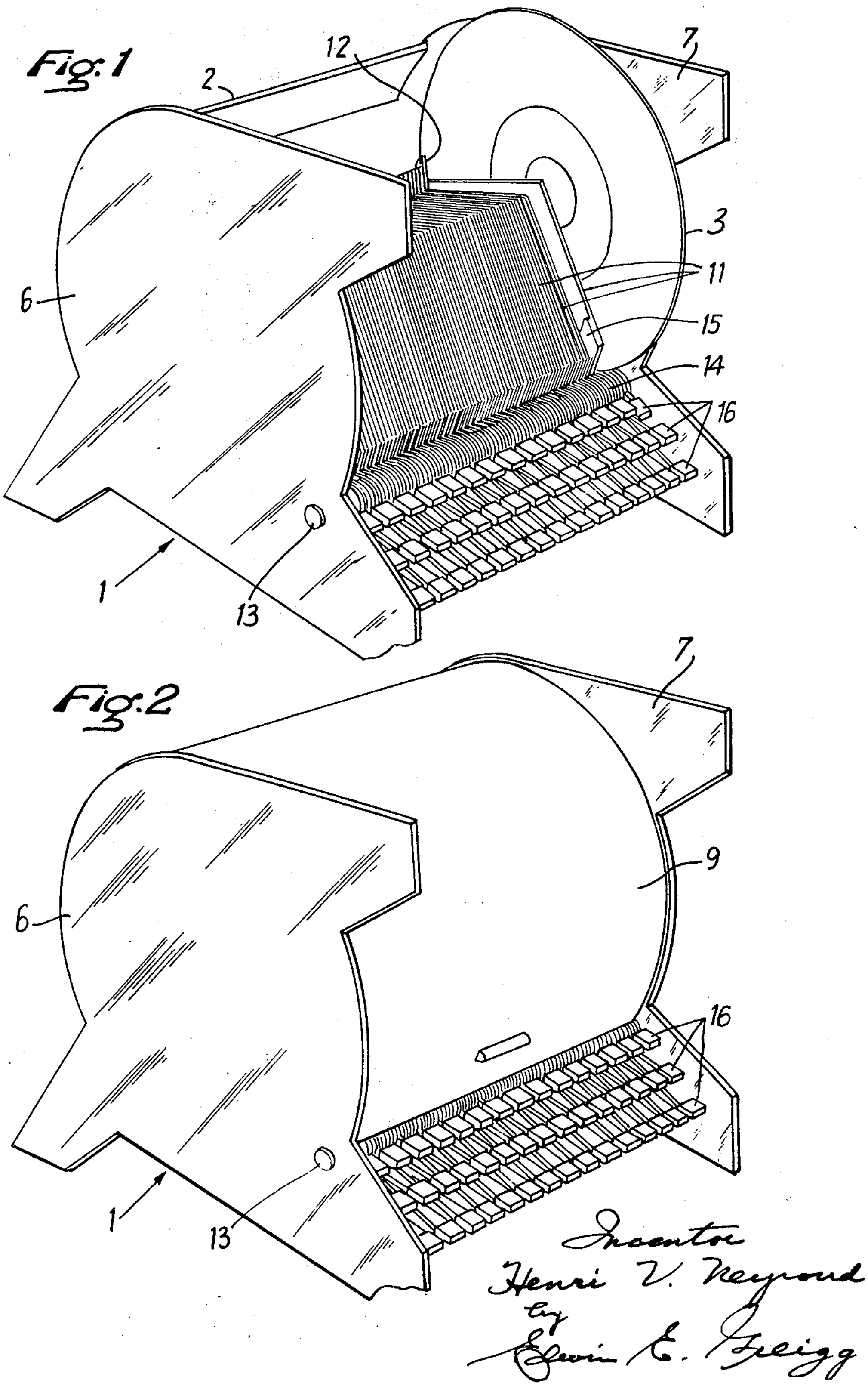
FIG. 1 is a perspective view of the novel record selector showing only a single record (in its position of presentation) for clarity.
FIG. 2 shows the record selector of FIG. 1 in a closed position.

Turning now to FIG. 1, the novel record selector comprises a housing generally indicated at 1, formed substantially of a rear wall 2 of cylindrical surface, the internal diameter of which is slightly larger than the diameter of the phonograph records 3 (only one shown), two opposed side walls 6 and 7 and a sliding closure 9 arranged coaxially with the cylindrical rear wall 2.

Figure 3:
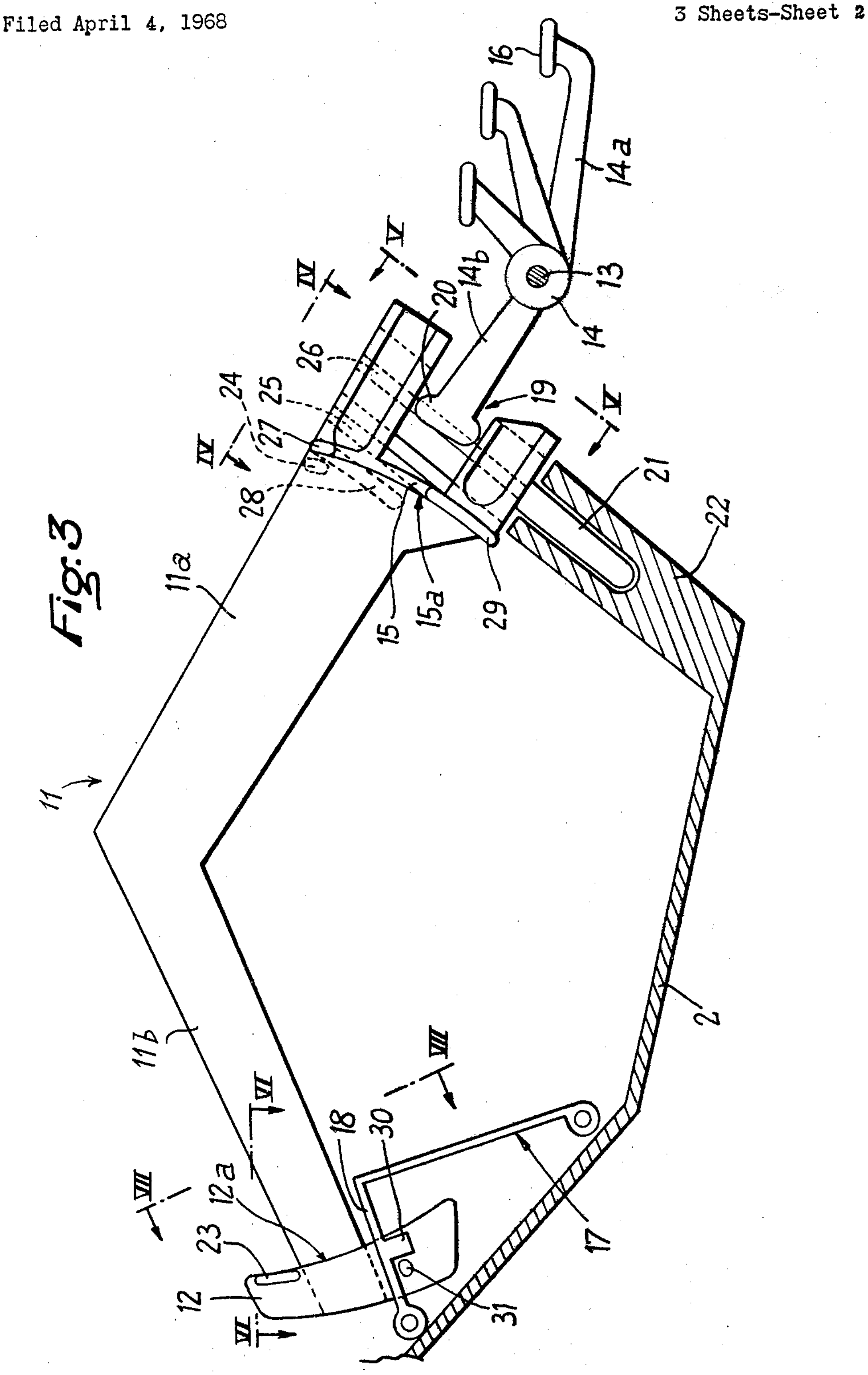
FIG. 3 is a side elevational view of one unit of the selector mechanism.

Inside the housing 1 between the side walls 6 and 7 there extends a horizontal series of aligned flat arms 11 with their large sides vertically oriented. Each arm has an inverted, wide-open V shape, and is spaced from an adjacent arm 11 at a distance slightly larger than the thickness of a record. Branch **11*a* of arm 11 extends upward and rearward from the front of the selector, while branch 11*b* of arm 11** extends rearward in a slightly downward sloping manner (FIG. 3).

Figure 6:
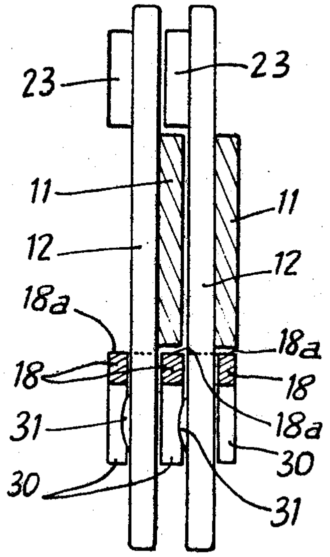
Figure 7:
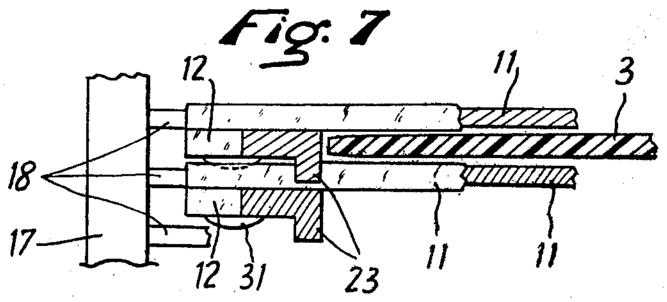

At its free end each branch **11*b* carries a flat cradle element 12 secured to one large side thereof. Each cradle element 12 is of an elongated shape and forms with the branch 11*b* a T-like configuration. Since the thickness of cradle element 12 is slightly less than the space between two adjacent branches 11*b*, the element 12 may extend therethrough with a small clearance as seen in FIG. 6. The inwardly turned long edge 12*a* (FIG. 3) of cradle element 12 is arcuate and is adapted to engage a circumferential portion of a phonograph record 3 disposed between two arms 11. In order to close off the aforenoted clearance between cradle element 12 and an adjacent branch 11*b* and thus prevent a possible jamming of record 3, there is provided on each cradle element 12, above the branches 11*b*, a lug 23 extending over the adjacent branch 11*b***, as shown in FIGS. 6 and 7.

At its frontal end portion each branch **11*a* carries a cradle element 15 having a thickness identical to that of cradle element 12. The element 15 is secured to the same side of arm 11 as element 12 and projects downwardly. Cradle element 15 has an inwardly facing long, arcuate edge 15*a* which is adapted to engage another circumferential portion of the same phonograph record 3 engaged by edge 12*a* of cradle element 12 of the same arm 11. Thus, as it best appears from FIG. 3, when a phonograph record 3 is inserted into the space between two adjacent arms 11, the mid-portion thereof will extend approximately across the middle of the record, while the latter is supported in a cradle-like manner by the cooperating arcuate edges 12*a*, 15*a* of respective cradle elements 12 and 15**.

Spaced forwardly from the free end of branches **11*a* of arms 11 there extends a horizontal shaft 13 secured to side walls 6 and 7 of housing 1 (FIGS. 1 and 2). To shaft 13 there is pivotally secured a series of bell cranks 14, each aligned with an arm 11. Bell crank 14 has an outwardly projecting leg 14*a*, the end of which is provided with a key 16 for manual depression, and an inwardly projecting leg 14*b* terminating in a head 20. The free frontal enlarged end of each branch 11*a* is provided with a slot or recess 19 adapted to receive the head 20 of bell crank 14** (FIG. 3).

If a key 16 is depressed, the leg **14*b* swings upwardly, whereby head 20 lifts the associated arm 11 which by virtue of its cradle elements 12 and 15, carries with it the record 3. Thus, the selected record 3** now projects out of alignment with the other records and is thereby presented and ready for easy manual removal.

As seen in FIG. 3, legs **14*a* of three successive bell cranks 14 are of different lengths and form different angles with their associated leg 14*b* for the purpose of providing a three-level keyboard as seen in FIGS. 1 and 2. In order to ensure that each arm 11 will be raised at substantially identical height, the length of leg 14_b_ is dimensioned so that the leverage of keys 16** will be the same regardless of their level in the keyboard.

In order to ensure that each selected arm 11 be displaced parallel to itself and to the plane of its large side, guiding means are provided which will now be described.

Two types of guiding means are provided for each arm 11: those secured to the housing 1 in a stationary manner and those carried by an adjacent arm 11.

Each branch 11_a_ carries at its frontal lower portion a downwardly projecting guiding finger 21 extending parallel with the large side of arm 11 and in the direction of the displacement thereof. The finger 21 is snugly but slidably received in a guiding trough 22 which is an integral part of the frontal, lower portion of the housing 1 (FIG. 3).

Within the housing 1 under the rear terminal portion of branches 11_b_ there is disposed a rack generally indicated at 17 formed of a series of juxtaposed laminae 18 each aligned with a branch 11_b_. As seen in FIGS. 3, 6 and 7, the downwardly extending lower portion of cradle element 12 is slidingly received in the space between two laminae 18 while in the position of rest of arm 11, the lower edge of branch 11_b_ abuts against the upper edge 18_a_ of lamina 18 (in FIGS. 3 and 6 arms 11 are shown in a slightly elevated position for clarity).

Figure 4:
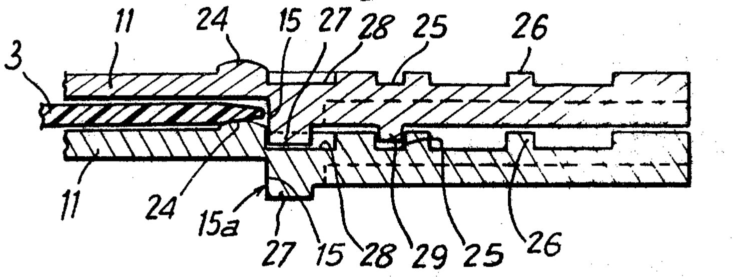
FIGS. 4, 5, 6 and 7 are views taken along lines IV—IV, V—V, VI—VI and VII—VII, respectively, of FIG. 3.

The cradle element 15 carries at its upper external portion a slightly protruding boss 27 adapted to cooperate with a groove 28 extending parallel to the finger 21 on one face of an adjacent branch 11_a_. As seen in FIGS. 3 and 4, boss 27 is guided in groove 28, the ends of which also provide an abutment therefor to limit the extent of displacement of selected arm 11. Similarly, at its lower external portion the element 15 carries a slightly protruding boss 29 adapted to extend into a complemental groove 25 parallel to groove 28 and disposed in the adjacent branch 11_a_. The cooperation between boss 29 and groove 25 results in a further guidance for arm 11.

Summarizing the aforedescribed guiding means, upon depressing a selected key 16, the associated arm 11 will be displaced parallel to itself in an accurately guided manner without the risk of lateral shift by virtue of the following cooperating elements: cradle element 12 and two adjacent laminae 18; finger 21 and guiding trough 22; boss 27 and groove 28; boss 29 and groove 25.

Figure 5:
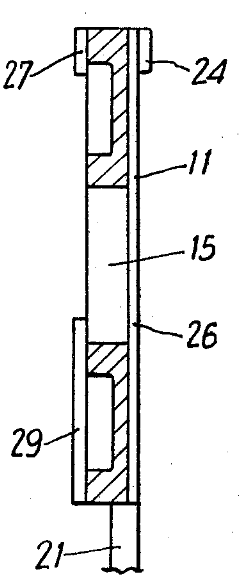

On the same face of branch 11_a_ that carries grooves 25 and 28, there is disposed, further outwardly therefrom, a bar-like rib 26 that straddles the recess 19 to prevent head 20 of bell crank 14 from becoming entangled in the recess 19 of an adjacent branch 11_a_ (FIGS. 3, 4 and 5).

Each branch 11_a_ carries at its frontal portion on its face remote from the cradle element 15 a slightly protruding boss 24 for the purpose of urging the record 3 against the adjacent branch 11_a_ by which that record is supported.

In order that the arm 11 does not drop into its position of rest by gravity after removal of the record and release of key 16, each lamina 18 of the rack 17 carries an elastically deformable tab 30 adapted to come into frictional engagement with a boss 31 carried by the element 12 when the selected arm 11 is lifted. Thus, boss 31, in cooperation with tab 30 maintains the empty arm 11 in a raised position (FIGS. 3, 6 and 7). By virtue of this feature the proper place of the removed record may be immediately located when the record is to be placed back into the selector. The weight of the record or a very slight downward push will cause disengagement between tab 30 and boss 31, and as a result, the arm 11 will be lowered into its position of rest.

What is claimed is:

1. A phonograph record selector of the type wherein the records are stored in an upright position and in a horizontally aligned series, comprising:

(A) a plurality of substantially horizontally disposed elongated arms arranged in a horizontally extending series and spaced one from another sufficiently to receive a record between adjacent arms, (B) cradle means secured to at least one end of each of said arms and extending in the space between two adjacent arms to partially circumferentially support said record, (C) actuating means linked to one end of each of said arms to lift any selected arm causing the record supported by the cradle means secured to said selected arm to be raised out of alignment with the other records arranged in said horizontally aligned series, and (D) separate guide means associated with both ends of each of said arms to ensure an accurately guided displacement of said selected arm upon operation of said actuating means associated therewith, said guide means including a rack disposed in a stationary manner below one end of said arms, said rack formed of a horizontal series of laminae each aligned with one of said arms and each spaced from one another sufficiently to receive a record between adjacent laminae, one said cradle means being secured to the arm end adjacent said rack and having a downwardly extending portion received between two adjacent laminae, one face of each lamina serving as a support for the arm immediately thereabove when the latter is in its position of rest.

2. A phonograph record selector as defined in claim 1, wherein each said lamina includes an elastically deformable tab and said downwardly extending portion of said cradle means includes a boss, said tab and said boss adapted to frictionally engage one another when any selected arm is lifted to prevent said selected arm from dropping into its position of rest by gravity.

3. A phonograph record selector as defined in claim 1, wherein said guide means further include a stationary guiding trough disposed below the end of said arms remote from said rack, a downwardly extending finger rigidly secured to each arm and slidably received in said trough.

4. A phonograph record selector as defined in claim 3 wherein said guide means further include at least one boss disposed on each arm and protruding towards one adjacent arm and into complemental grooves provided therein, said grooves are arranged parallel with said downwardly extending fingers.

5. A phonograph record selector as defined in claim 4, wherein at least one of said grooves in each arm has a defined and delimited length dimension to limit the extent of the upward displacement of said arms.

6. A phonograph record selector of the type wherein the records are stored in an upright position and in a horizontally aligned series, comprising:

(A) a plurality of substantially horizontally disposed elongated arms arranged in a horizontally extending series and spaced one from another sufficiently to receive a record between adjacent arms, (B) cradle means secured to at least one end of each of said arms and extending in the space between two adjacent arms to partially circumferentially support said record, at least one cradle means on each arm being provided with a portion extending upwardly from said arm, a lug secured to said upwardly extending portion, said lug projecting laterally over an adjacent arm to bridge the clearance between said cradle means and the adjacent arm for preventing said record from becoming jammed therebetween, (C) actuating means linked to one end of each of said arms to lift any selected arm causing the record supported by the cradle means secured to said selected arm to be raised out of alignment with the other records arranged in said horizontally aligned series, and (D) separate guide means associated with both ends of each of said arms to ensure an accurately guided displacement of said selected arm upon operation of said actuating means associated therewith.

7. A phonograph record selector as defined in claim 6, wherein at least one cradle means on each arm is provided with a portion extending upwardly from said arm, a lug secured to said upwardly extending portion, said lug projects laterally over an adjacent arm to bridge the clearance between the cradle element and the adjacent arm for preventing said record from becoming jammed therebetween.

8. A phonograph record selector as defined in claim 7, wherein each arm carries a boss projecting towards an adjacent arm and adapted to slightly urge said record thereagainst and into a secure engagement with said cradle means carried by said last named adjacent arm.

9. A phonograph record selector of the type wherein the records are stored in an upright position and in a horizontally aligned series, comprising:

(A) a plurality of substantially horizontally disposed elongated arms arranged in a horizontally extending series and spaced one from another sufficiently to receive a record between adjacent arms, (B) cradle means secured to at least one end of each of said arms and extending in the space between two adjacent arms to partially circumferentially support said record, (C) actuating means linked to one end of each of said arms to lift any selected arm causing the record supported by the cradle means secured to said selected arm to be raised out of alignment with the other records arranged in said horizontally aligned series, said actuating means including a plurality of levers, one associated with each of said arms, one end of each lever extending into a recess in said arm, the other end of said lever including manually operable means, said recess straddled at least at one side thereof by a bar-like rib to prevent a lever associated with one arm from becoming entangled in the recess of an adjacent arm and (D) separate guide means associated with both ends of each of said arms to ensure an accurately guided displacement of said selected arm upon operation of said actuating means associated therewith.

10. A phonograph record selector of the type wherein the records are stored in an upright position and in a horizontally aligned series, comprising:

(A) a plurality of substantially horizontally disposed elongated arms arranged in a horizontally extending series and spaced one from another sufficiently to receive a record between adjacent arms, (B) cradle means secured at at least one end of each of said arms and extending in the space between two adjacent arms to partially circumferentially support said record, (C) actuating means linked to one end of each of said arms to lift any selected arm causing the record supported by the cradle means secured to said selected arm to be raised out of alignment with the other records arranged in said horizontally aligned series, said actuating means including a plurality of levers, one associated with each of said arms, one end of each lever extending into a recess in said arm, the other end of said lever including manually operable means, each lever being formed as a bell crank and being pivotally held in a horizontal series by a stationary shaft extending parallel to and spaced from the horizontal series formed by said arms and (D) separate guide means associated with both ends of each of said arms to ensure an accurately guided displacement of said selected arm upon operation of said actuating means associated therewith.

References Cited

UNITED STATES PATENTS

| | | | |
|---|---|---|---|
| 2,619,966 | 12/1952 | Gallia | 312—15 X |
| 2,944,859 | 7/1960 | Ivanoff | 312—15 |
| 2,981,581 | 4/1961 | Karlsson | 312—15 |

CASMIR A. NUNBERG, Primary Examiner